United States Patent

Heggie

[11] Patent Number: 4,679,396
[45] Date of Patent: Jul. 14, 1987

[54] ENGINE CONTROL SYSTEMS

[76] Inventor: William S. Heggie, 74 Woodfield Drive, Ottawa, Ontario, Canada

[21] Appl. No.: 569,157

[22] Filed: Jan. 9, 1984

Related U.S. Application Data

[63] Continuation-in-part of Ser. No. 385,438, Jun. 7, 1982, abandoned, which is a continuation-in-part of Ser. No. 099,984, Dec. 3, 1979, abandoned.

[30] Foreign Application Priority Data

Dec. 8, 1978 [CA] Canada .................................. 317645

[51] Int. Cl.$^4$ ............................................. F16D 31/02
[52] U.S. Cl. ........................................ 60/414; 60/417; 60/428; 60/431; 60/490; 60/491
[58] Field of Search ................. 60/414, 416, 418, 417, 60/428, 431, 487, 488, 490, 491, 492; 180/165, 307

[56] References Cited

U.S. PATENT DOCUMENTS

| | | | |
|---|---|---|---|
| 3,175,354 | 3/1965 | Firth et al. | 60/414 |
| 3,436,913 | 4/1969 | Müller et al. | 60/416 |
| 3,890,360 | 6/1975 | Pruvot et al. | 60/431 |
| 4,098,083 | 7/1978 | Carman | 60/414 |
| 4,098,144 | 7/1978 | Besel et al. | 60/416 |
| 4,108,265 | 8/1978 | Abels | 60/491 X |

Primary Examiner—Edward K. Look

[57] ABSTRACT

Engine BMEP being a major contributor to the gap between conventional automobile road fuel mileage and the theoretically possible, indicates the desirability of a continuously variable road wheel/engine speed ratio. There is described a double swash plate, regenerative, hydrostatic system, with a mechanical bypass. The two swash plates facilitate optimization of hydraulic parameters as well as engine BMEP and the rear one which is the primary controller permits modulation of regenerated energy in both directions, with optimum efficiency and facility.

3 Claims, 9 Drawing Figures

COMBINED SYSTEM

ENGINE CONTROL SYSTEMS

This application is a continuation-in-part of Ser. No. 385,438 filed June 7, 1982, now abandoned, which is a continuation-in-part of Ser. No. 099,984, filed Dec. 3, 1979, now abandoned.

This invention relates to engine control systems.

In engines such as those used in, for example, cars, trucks, earth moving machinery or in stationary engines it is a continual problem to optimize the engine speed in relation to various parameters, in other words to efficiently transmit the output of an engine to a load. Particularly with the gasoline/spark ignition version of the reciprocating engine, considerable effort has previously been expended with a view to optimizing the engine.

According to the present invention there is provided a system for optimizing the operation of an engine for maximum output including a first device and a second device, each interconnected to control the engine speed in accordance with a function of at least one algebraic expression.

Figure 1:
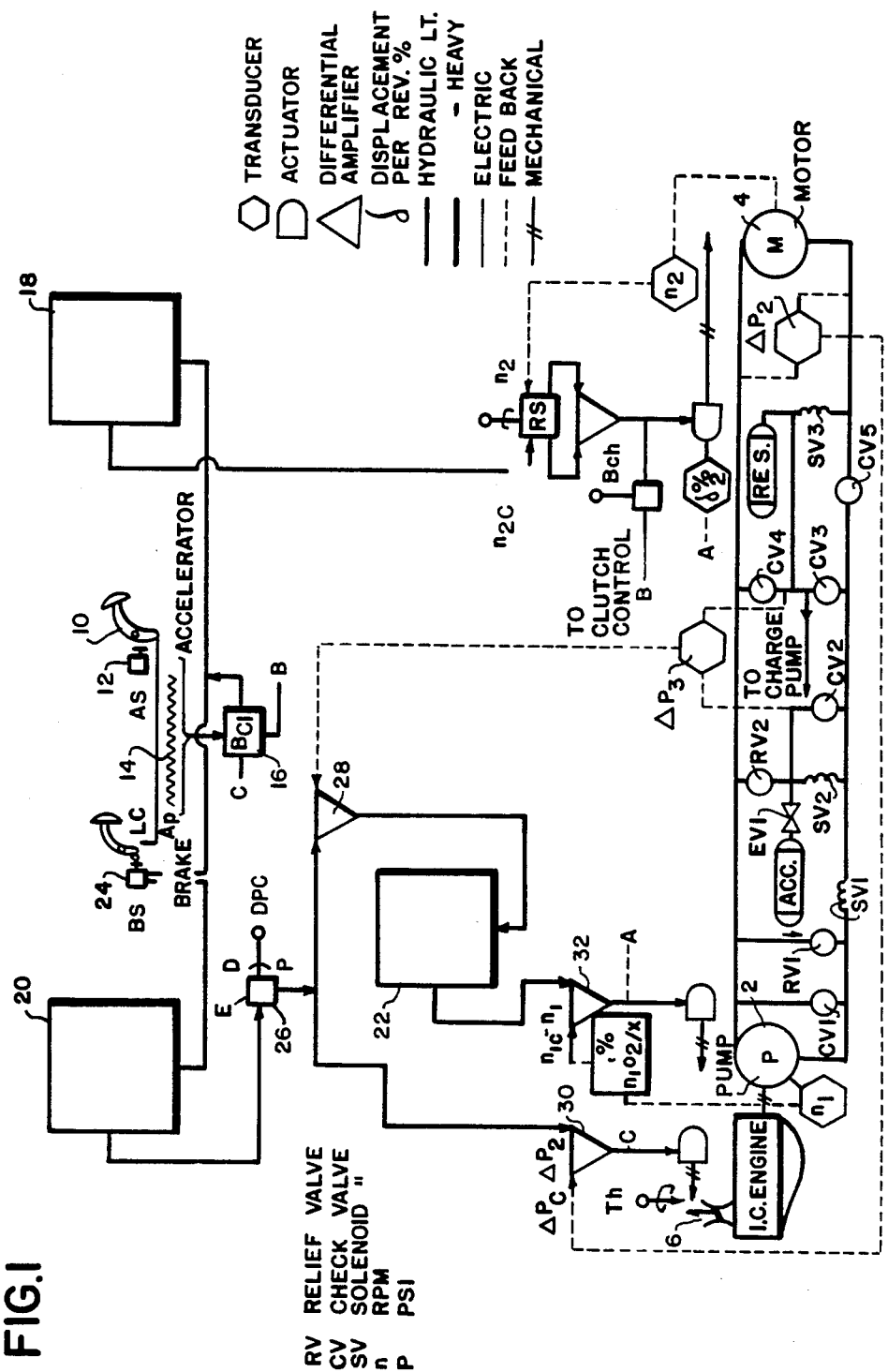

Embodiments of the present invention will now be described, by way of example, with reference to the accompanying drawings in which:

FIG. 1 is a flow and control diagram of an embodiment of the invention.

Figure 1A:
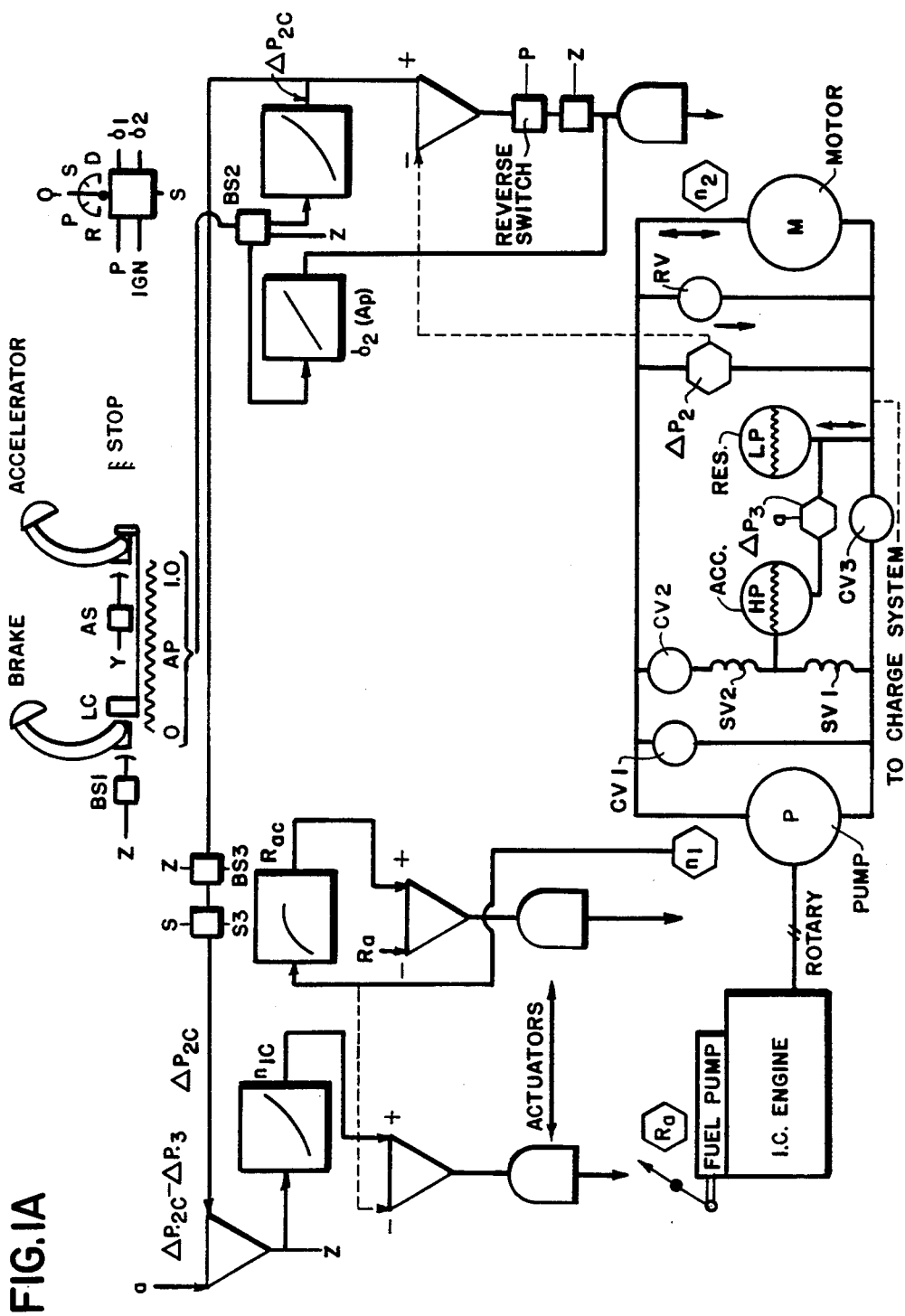
Figure 2:
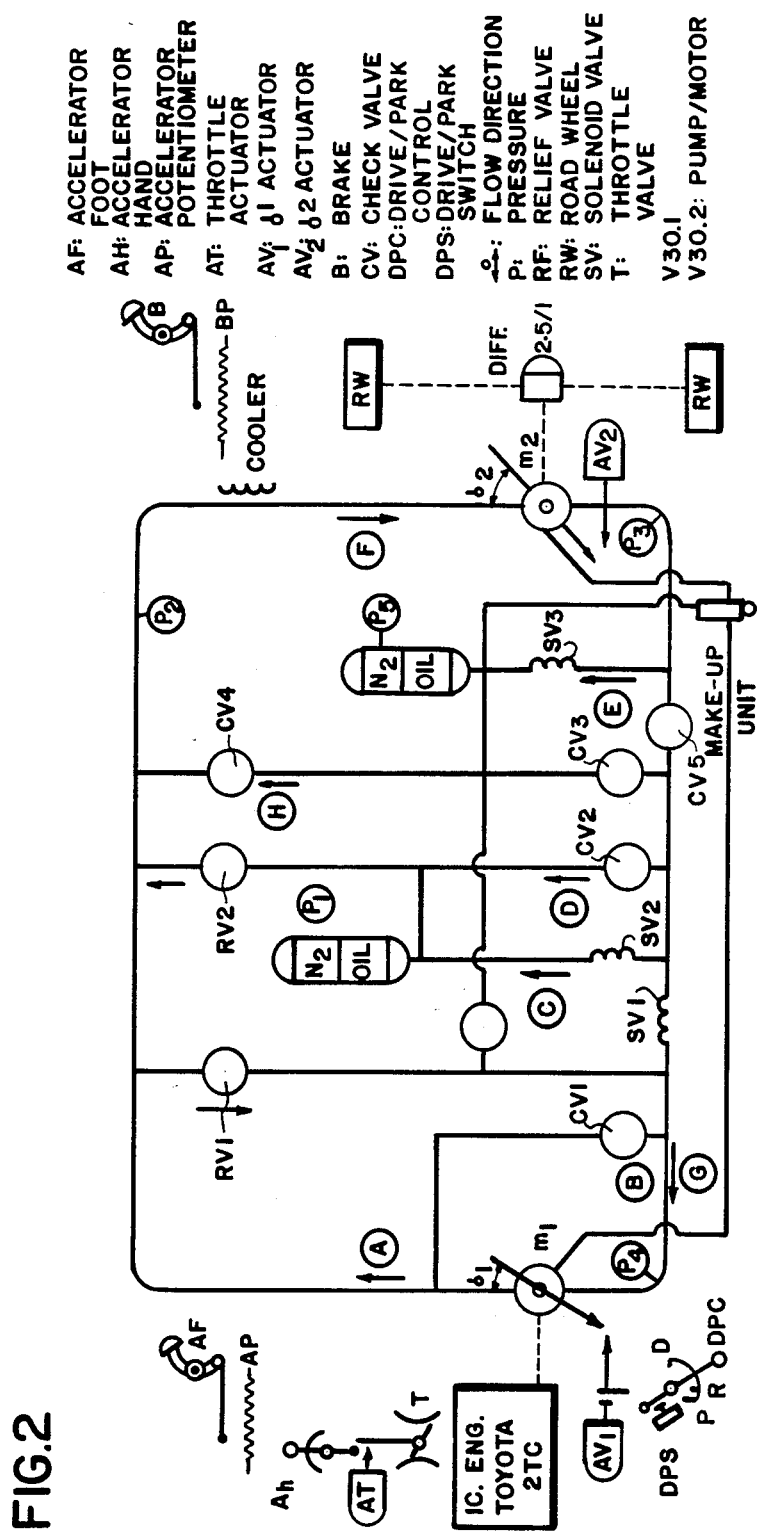
Figure 3:
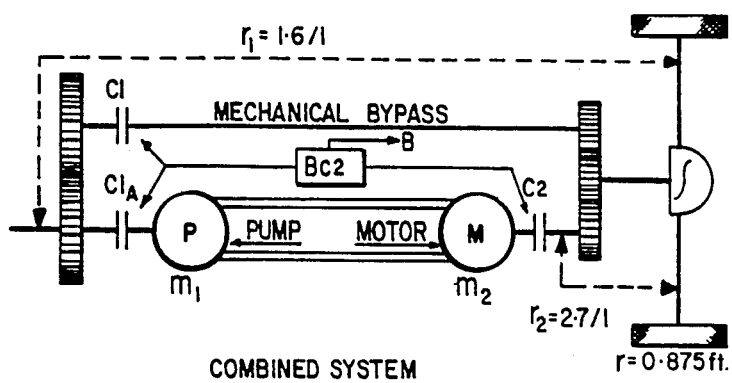
Figure 4:
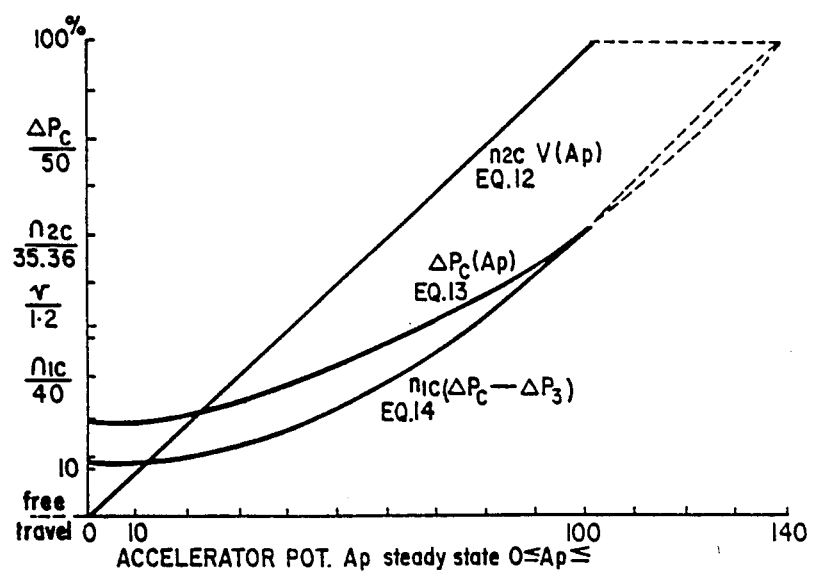
Figure 5:
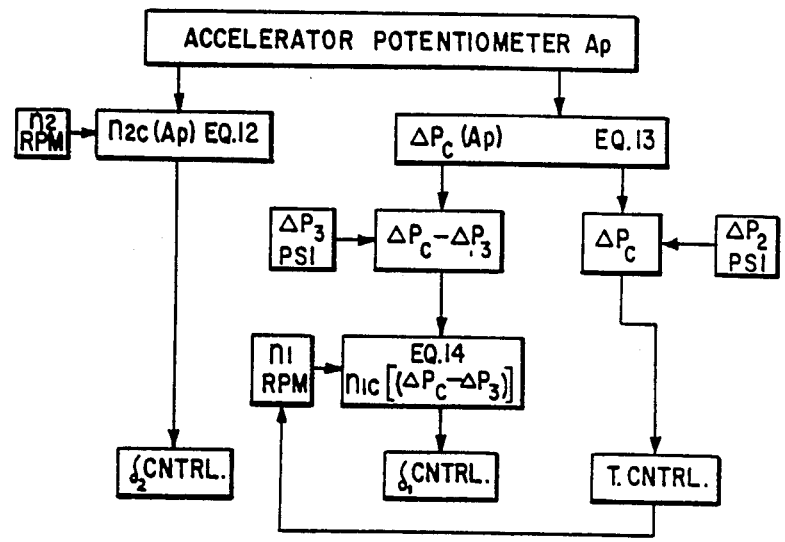
Figure 6:
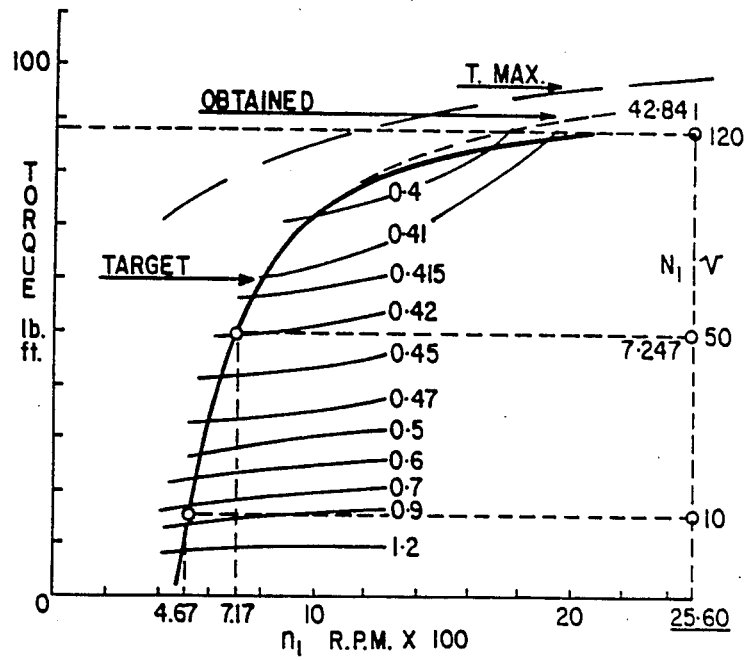
Figure 7:
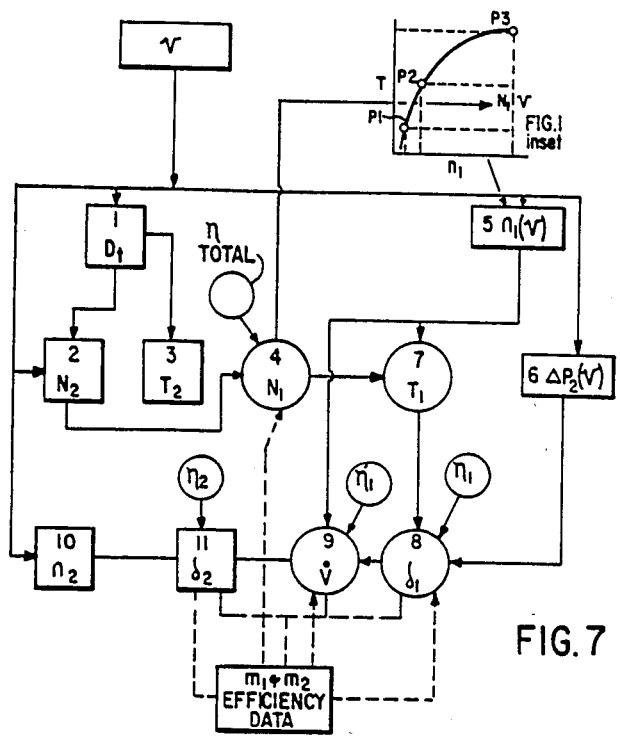
Figure 8:
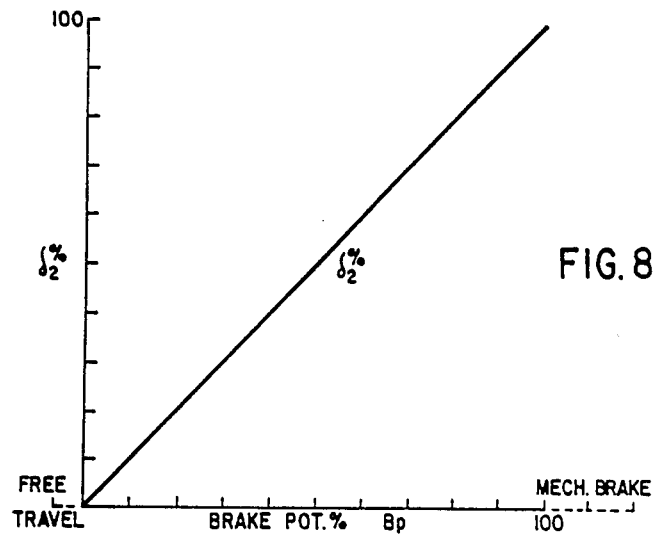

FIG. 1A is a modification of the embodiment shown in FIG. 1, particularly for use with a diesel engine, FIG. 2 represents a portion of FIG. 1, particularly showing the hydraulics system, FIG. 3 is a diagrammatic representation of part of the system as used for an automobile and showing the clutches, FIG. 4 is a representation of a control curve plotting certain equations as a function of the accelerator potentiometer output, FIG. 5 is a diagrammatic representation of some of the electronic control logic, FIG. 6 is a graphical performance map for a Toyota 2TC engine, FIG. 7 is a diagrammatical representation of a mathematical flow chart, and FIG. 8 is a representation of a brake control curve.

It will be understood that a gasoline engine in an automobile which has a conventional transmission system very rarely works at its optimum specific fuel consumption. Attempts have been made to optimize the fuel consumption of a car under highway conditions by providing three-speed gear boxes and other conventional systems. It is well known that if an infinite number of gears was available then an extremely talented driver could reduce fuel consumption to about half the normal value.

Using a hydrostatic system in the transmission it is possible to provide a continuously variable speed ratio between the engine and the road wheels. The described embodiment of the present invention provides a hydraulic system whose efficiency can be optimized whereby the operating efficiency of the engine is optimized in accordance with road conditions as they change so that an improved specific fuel consumption for any given road load is obtained. This is one advantageous result which may be achieved by using the described embodiment of the invention.

A second advantageous result which may be achieved by using the described embodiment of the invention is that un-used kinetic energy can be stored hydrostatically in an accumulator by compressing a gas such as nitrogen. As is well known, when, for example, a car is driven towards traffic lights which suddenly change to red whereby the car has to stop, then kinetic energy is wasted. However, by using the described embodiment of the invention, this kinetic energy of the car can be stored by causing it to drive liquid into a cylinder. When the car gets a green light, then the kinetic energy is released and re-used to drive the car up to speed again.

FIG. 1 is a flow and control diagram of an embodiment of the invention. It will be seen that two hydraulic units, a pump 2 and a motor 4 are provided, whereby the pump drives the motor. Both these units are variable displacement units using swash plates together with an electronic system to control the angle of the swash plates in such a way as to optimize hydraulic pressure and flow having regard to efficiency and engine torque as well as speed. This is basically effected by using three equations, as described below.

For convenience, we set forth below a list of the symbols which will be used in the following description:

| LIST OF SYMBOLS | |
|---|---|
| a | Acceleration |
| BHPh | Brake horsepower hour |
| BMEP | Brake mean effective pressure |
| BSFC | Brake specific fuel consumption |
| D | Diameter of accumulator |
| $D_r$ | Rolling drag = $k_1$ = 45 lb |
| $D_a$ | Aerodynamic drag |
| $D_t$ | Total drag = $D_r + D_a$ |
| $d_1$ | Pump displacement |
| $d_2$ | Motor displacement |
| $\Delta E$ | Energy stored per unit mass of gas |
| F | Braking force |
| F' | Thrust force |
| g | Acceleration of gravity = 32.2 [ft/s$^2$] |
| h | Conversion factor = 33000 [ft lb/min HP] |
| $k_1$ | Rolling drag = $D_r$ |
| $k_2$ | Drag coefficient |
| m | Mass = w/g |
| $N_1$ | Engine power output |
| $N_2$ | Motor power output |
| $n_1$ | Rotational speed of engine and pump shaft |
| $n_2$ | Rotational speed of motor shaft |
| $n_{2c}$ | Motor speed command function f(Ap) |
| $n_{1c}$ | Engine speed command function f($A_p$) |
| $n_3$ | Rotational speed of axle |
| $n_f$ | Engine speed control function f[($\Delta P_c - P_3$)] |
| P | Pressure |
| $P_1$ | Accumulator pressure |
| $\Delta P_2$ | System pressure |
| $P_3$ | Motor outlet pressure |
| $\Delta P_3$ | Accumulator pressure diff. $P_4 - P_3$ |
| $P_4$ | V 30.1 inlet pressure |
| $\Delta P_4 = \Delta P_c - \Delta P_c = P_2 - P_4$ | |
| $\Delta P_c$ | Pressure command function f(Ap) |
| $P_5$ | Reservoir pressure |
| $P_{11}$ | Initial value of $P_1$ |
| $P_{12}$ | Maximum value of $P_1$ = maximum acceptable system pressure |
| r | Roadwheel effective radius (0.875 ft) |
| $r_2$ | Motor to road wheel ratio 2.7/1 |
| $r_1$ | Mechanical bypass ratio 1.3/1 |
| $r_e$ | Rig constant (equivalent road wheel radius) = $r/r_2$ |
| s | Distance covered |
| $T_1$ | Engine torque |
| $T_2$ | Motor torque |
| T | Absolute temperature (Appendix I and Reference 1) |
| V | Volume of gas in accumulator |
| $\dot{V}$ | Rate of flow of liquid |
| $v$ | Velocity over road |
| $v_{1\ min}$ | Minimum initial velocity |
| W | Work or kinetic energy |
| w | Weight of car |

-continued
LIST OF SYMBOLS

| | |
|---|---|
| $w_g$ | Weight of gas in accumulator |
| $\delta_1$ | Displacement of pump expressed as fraction of maximum |
| $\delta_2$ | Displacement of motor expressed as fraction of maximum |
| $\eta_1\eta_2$ | Mechanical efficiency of pump and motor |
| $\eta_1'\eta_2'$ | Leakage factor of pump and motor |
| $\rho$ | Density of nitrogen gas |
| $\sigma$ | Acceptable stress |

Referring to FIG. 1 an accelerator pedal 10 is provided for operation by the driver of an automobile when he requires a greater drive wheel speed. The pedal 10, when pressed, is effective to operate an accelerator switch 12 and an accelerator potentiometer 14. Switch 12 is operative to open a solenoid valve SV1, to be discussed below, whilst accelerator potentiometer 14 produces a voltage signal Ap having a voltage dependent on the setting of pedal 10 which is applied through electronic control circuits and a servo actuator to control the setting of a throttle butterfly valve 6. The electronic control circuits include a clutch switch 16, an electronic unit 18 which performs in accordance with equation 12 below, an electronic unit 20 which performs in accordance with equation 13 below, an electronic unit 22 which performs in accordance with equation 14 below, and a brake switch 24. Units 18, 20 and 24 may include read-only memories and it will be seen that brake switch 24 connects to the electronic unit 20. The latter connects through switch unit 26 to differential amplifiers 28 and 30. The output of differential amplifier 28 is fed to electronic unit 22 whose output is fed to a differential amplifier 32. Outputs from differential amplifiers 30 and 32 are fed to respective actuators, as shown, for the butterfly valve throttle 6 of the engine and to affect the swash angle of the first swash plate device, pump 2.

As shown diagrammatically in FIG. 1, the pump 2 is connected to motor 4 by way of a first high pressure upper hydraulic line and a second low pressure lower hydraulic line. A check valve, identified as CV1, is connected between the two hydraulic lines in parallel with said first swash plate device 2 to form a by-pass hydraulic line. The second hydraulic line includes a first solenoid valve SV1 and a check valve CVS.

A high pressure accumulator unit ACC is connected between the upper high pressure hydraulic line and the lower low pressure hydraulic line by way of a valve EV1 and respectively a relief valve RV2 and a second solenoid valve SV2. A check valve CV2 is connected across SV2. A further two check valves CV3 and CV4 are connected between the lower and upper hydraulic lines whilst a low pressure reservoir RES is connected to the junction of CV3 and CV4 with a further solenoid valve SV3 connected, as shown, from the low pressure reservoir to the lower hydraulic line.

A connection is shown in FIG. 1 from the electronic control unit 18 to a reverse switch unit RS which is connected to a further actuator associated with the second swash plate device, motor 2, to affect the swash angle thereof.

In operation, as will be understood, energy from the engine is converted into flow energy by the variable displacement hydraulic pump 2. This energy is converted into mechanical energy by the bi-directional variable displacement hydraulic motor 4. The potential for recovering the kinetic energy normally dissipated during braking is accomplished by operating the swash plate device 4 so that it acts as a pump supplying oil and flow energy to the hydro—pneumatic accumulator unit ACC. The pressurized reservoir RES can be connected to the low pressure side of the illustrated main hydraulic loop formed by the said lower and upper hydraulic lines and is used to accomodate the oil for the charging—discharging operation of the accumulator ACC. Transducer units are provided to produce the required requisite signals as shown—for example, the transducer associated with pump 2 is mechanically coupled to the pump 2 and provides a signal which is indicative of the speed of the pump 2. This signal is fed, as shown, to part of the circuitry, identified $n_1\delta_2\%/X$, which also receives a signal at A from the transducer associated with the motor 4. An input $n_{1c}-n_1$ is fed to one input of the differential amplifier which provides a signal to the actuator affecting the swash place angle of the pump 2. When $n_1 = n_{1c}$ the servo motor of the actuator stops moving.

In FIG. 1, it will be seen that the driver of the vehicle controls the operation of the system through inputs at the accelerator pedal (Ap) and the brake pedal. In the "normal" mode (partial or no accumulator operation) an input at the accelerator pedal affects three different servochannels, and thus affects the actuators, simultaneously causing modulation of engine throttle, pump swash angle, and motor swash angle. In the "boost" mode (direct accumulator operation) the engine throttle and pump swash angle circuits are disengaged and the motor swash angle becomes directly proportioned to Ap. Input at the brake pedal engages one of the servochannels causing motor swash plate modulation in direct proportion to the input.

When the accumulator is charged so as to be available for use and the driver presses on the accelerator pedal 10, switch 12 operates and this causes solenoid fluid valves SV1 and SV2 to open so that fluid pressure can pass therethrough. Thus, fluid pressure from the accumulator ACC is applied to the reverse side of the check valve CV5 causing it to close and prevent fluid flow therethrough. Fluid pressure is also applied to the flow side of the check valve CV1 and this automatically transmits fluid pressure to the second swash plate device, motor 4, along the upper hydraulic line (without additional controls for the said valves). This vehicle acceleration is achieved as a result of the energy stored in the accumulator ACC.

If the situation arises where the driver's pressure on the accelerator pedal 10 calls for a fluid pressure greater than that available from the accumulator ACC, then the engine throttle 6 is opened and the first swash plate device, pump 2, which is connected mechanically to the engine, is caused to run and to provide an increased pressure on the upper hydraulic line. This provides a pressure differential across check valve CV1 causing it to close automatically without the action of further control devices. Thus, fluid cannot pass therethrough but instead is applied along the lower hydraulic line to the pump 2. Thereby the accumulator pressure and the pump pressure are combined in series so as to be additive. Thus, there is illustrated a simple method of combining the accumulator and engine outputs without complex controls and so as to optimize the operation of the engine driving the wheels of the vehicle by way of the usual mechanical connection to the second swash plate device. motor 4, so as to achieve maximum output of the system and efficient use of energy from the engine.

Referring to FIG. 1A, it will be seen that this diagrammatically illustrates an embodiment which constitutes a simpler system than FIG. 1 but with a diesel engine.

It will be apparent that there are five basic modes of operation for the hydraulic drive system of FIG. 1A. These modes will now be discussed in terms of control and hydraulic systems operation.

1. Acceleration Under Engine Action Alone—Normal Mode

Assuming no available accumulator charge, an input at the accelerator pedal commands a system pressure. This is fed into three servochannels simultaneously causing optimum modulation of the pump swash angle ($\delta_P$), the motor swash angle ($\delta_M$), and the engine throttle position ($\delta_e$) according to the control system set point functions. In addition, an accelerator input (above 5%) causes valve SV1 to open. As shown in FIG. 1A high pressure hydraulic flow is from the pump to the motor where it is converted into mechanical energy to drive the vehicle. Low pressure flow is along the lower hydraulic line from the motor back to the pump. The pressure differential keeps CV1 closed and although SV1 is open, there is no flow from the accumulator (no available charge).

2. Acceleration Under Accumulator Action Alone—Boost Mode

In this mode the accumulator has been charged ($P_1$) due to a previous braking operation to a level above the system pressure command. An input at the accelerator pedal commands a system pressure as described above in Section 1. However, due to the availability of accumulator charge the $\delta_e$ and $\delta_P$ circuits are disengaged and motor swash angle becomes directly proportional to the accelerator pedal position (Ap). In addition, an accelerator input (above 5%) causes valve SV1 to open. As shown in FIG. 1A, high pressure hydraulic flow is from the accumulator through SV1. The pressure differential opens CV1 thus bypassing the pump 2 allowing direct flow connection to the motor where it is used to drive the vehicle. Low pressure flow is from the motor to the reservoir. This situation continues with the accumulator supplying the total power demand until the available accumulator fluid pressure equals 90% of the commanded system pressure.

3. Acceleration Under Combined Accumulator and Engine Action—Series Mode

In this mode the available accumulator fluid pressure has dropped to below 90% of the commanded system pressure and, as such, can no longer supply the total power demands for the vehicle. Control reverts to the situation described in Section 1 with optimum $\delta_e$, $\delta_P$, and $\delta_M$ modulation in response to the differential pressure between the accumulator and reservoir and representing the amount of energy to be supplied by the engine. With reference to FIG. 1A, intermediate pressure flows along the path from the accumulator through the pilot-operated check valve SV1 as in Section as above. However, the differential pressure closes CV1 and the flow is combined with the high pressure flow from the pump and together these work to drive the vehicle. This situation continues until the available accumulator fluid is exhausted at which time control reverts to engine action alone.

4. Braking

An input at the brake pedal generates a motor swash angle command ($\delta_{mc}$) (on the opposite side of centre) in direct proportion to the input. In addition, a brake pedal input (above 5%) causes valve SV2 to open and, the motor acts as a pump supplying high pressure flow to the accumulator for storage. Low pressure flow is from the reservoir to the motor. Should the accumulator fully charge during the cycle, a pressure overide on the motor will back off the motor swash plate. Further brake pedal displacement engages the vehicle service brakes. In addition, an internal relief valve in the motor protects the system against transient overpressures.

5. Deceleration (without brakes)—Coasting Mode

The final mode of operation occurs when there is no input at either the brake pedal or accelerator pedal as during coasting. With no input, the control system sends all functions to their "zero" state and, as will be appreciated, there is no high pressure flow in this mode. Low pressure flow is from the motor through CV1 and back to the motor if the motor swash plate does not return exactly to a zero angle.

From the above it will be seen that valves SV1 and SV2 permit accumulator charging and discharging via logic signals from the control system. Check valve CV1 prevents lockup during vehicle coasting and faciilitates accumulator direct operation. Check valves CV2 and CV3 prevent reverse flow from the accumulator in the high and low pressure sides.

In order to provide a greater understanding of the illustrated embodiments of the present invention, a more theoretical analysis will now be given. However, it will be understood that further practical details will emerge with partial repetition of details given earlier.

Referring particularly to FIGS. 1, 2 and 3, an accelerator potentiometer $A_p$ is controlled by the driver of an automobile in the same manner as he would control the present throttle control or accelerator in a car, but in this embodiment he commands a road wheel speed as the result of a selected voltage or some other parameter. This voltage we will call $A_p$ (accelerator potentiometer). This command from the accelerator potentiometer controls or commands the road wheel speed, i.e. the car velocity. Thus, the road wheel speed $n_{2c}$ is a function (which is equation 12 below) of the potentiometer position or output in FIG. 1 and the description below. This means that when the driver makes this command by opening his throttle the electronic control circuits will send the rear swash plate in motor 4 to maximum because, in fact, the road wheel speed cannot immediately be obtained due to car inertia and it takes time for the car to obtain that speed. In this way the system is prepared for receiving maximum acceleration if demanded. The control circuits are, of course, utilized to activate the solenoid valves and cause them to open or close as required.

The accelerator potentiometer also commands a system hydraulic pressure as a function of the same potentiometer (equation 13 below). Equation 13 therefore controls the system pressure via the throttle or, in other words, equation 13 is responsible for opening the throttle, which is a butterfly valve 6, to a position that can produce a given pressure in the system. This pressure is identified as $\Delta P_2$ and is the pressure that, in fact, creates the acceleration via the hydraulic motor. It is now necessary to control the swash plate of the pump 2 and in this way optimize the engine torque for best fuel consumption. This is done not directly as a function of $A_p$, the accelerator potentiometer position, but as a sub-function of a system pressure. When the system pressure command is effected it commands, via equation 14 below, an equivalent engine speed in r.p.m. by adjusting $\delta_1$. This is the displacement of the swash plate in the pump 2.

Therefore, the engine's operating parameters have been optimized to match road conditions at the best fuel consumption.

The reason for controlling engine speed as a function of pressure is so that the engine does not attempt to supply the energy that may be available from the accumulator.

The above description is concerned with the $n_1$ command cycle and this will be considered again later. For the moment, the regeneration cycle will be considered.

A car may be travelling at, for example, 30 m.p.h. and may suddenly need to be stopped. This may be, for example when traffic lights are red and the driver stops the car as a result of the system permitting the angle of the swash plate of the motor 4 to be increased. This pumps liquid from the reservoir to the accumulator against the head of gas in the accumulator, thereby storing the kinetic energy of the car from that speed down to zero. When the driver subsequently wants to move off and he opens his accelerator there may still be energy stored in the accumulator. Obviously the accelerator potentiometer should not command engine energy whilst accumulator energy is available because the accumulator must be emptied ready for a regeneration cycle when the car is next stopped. This is why $n_{2c}$ has been used as a function of pressure to control the engine speed via $\delta_1$, i.e., through the forward swash plate. What happens, in effect is, that $\Delta Pc$ minus $\Delta P3$ makes the command for engine speed. If $\Delta P3$ equals $\Delta Pc$ the engine will not operate but the car will move off under the accumulator energy. $\Delta P3$ is the pressure in the accumulator, and $\Delta Pc$ is the pressure commanded by the driver via the accelerator potentiometer. Should the driver increase his throttle command to a point where he commands a pressure greater than the accumulator pressure then $\Delta Pc$ minus $\Delta P3$ is a positive number and the engine will now assist the accumulator by causing a pressure differential across check valve CV1, (FIG. 1) thus closing the check valve and putting the pressure which would be created by the engine into series with the pressure from the accumulator and thus driving the car with the sum of the two.

It will be appreciated that at all times, when the throttle is open the accelerator switch AS causes all solenoid valves to open simultaneously, i.e. SV1, 2 and 3.

To recap,—when the commands a pressure by virtue of opening his throttle, if that pressure is less than the pressure in the accumulator there will be a negative command to the engine side of the electronic control circuits and this causes nothing to happen as far as the engine is concerned, but the accelerator switch will open the control valves allowing pressure from the accumulator to pass through CV1, i.e. check valve 1, and along the pressure line so as to drive the hydraulic motor before returning to the reservoir. Recapping again, should the driver now change his mind and command a pressure higher than the pressure in the accumulator, then the difference will be positive. This difference will cause a command for engine power via the equations previously referred to. The operation of the swash plate at the pump and the engine throttle, i.e. butterfly valve 6, will cause the pressure to rise across CV1 thus closing that valve. This now causes the engine effort to be added to the effort from the accumulator.

The system so far is capable of providing optimum control over engine fuel consumption and hydraulic system efficiency under steady state road conditions and this is achieved by the design parameters of the embodiment described. However, this is a variable because no account has been taken in these equations for change of grade because it is not known how steep the hill is going to be that that the driver is going to climb. Also, no account has been taken for the change of wind,—this would mean that the system would be incapable of following the curves and something would have to change. The thing that would change would be engine power which would increase and most probably go beyond the optimum. It must be remembered that in the steady state condition the $n_2$ command has been realized and the swash plate of the motor has found its optimum position for that steady state conditions.

If a car encountered a hill or a head wind the car would tend to slow down, and the motor swash plate would then remodulate. This would cause the system flow to increase for the same car speed and this would tend to increase the engine torque. This would be a change which would take place in the swash plate of the pump 2.

To avoid exceeding permissible torque or optimum torque another feedback signal has been introduced and is derived from the actual angle of the swash plate at the motor—A at $\delta_2$ in FIG. 1. This signal is fed to A at the left side of FIG. 1 whereby the engine speed command $N_{1c}$ is modified by that function which is $n_1\delta_2\%/x$, x being a parameter dependent on car design.

It is necessary to provide for reversing of the car and still keep the system flow in the same direction so that all components work in the normal way even in reverse. To do this a switch is introduced which reverses $n_{2c}$ and $n_{2c}$ inputs and causes the swash plate to move to the other side of center. This reverses the wheels whilst keeping the system operating in the same direction. A drive-park control is also required to allow the driver to start and rev. his engine without moving the vehicle and this is done by a drive-park switch which interrupts the signal from the basic $\Delta P$ command. Under these conditions there will be no positive swash plate angle at $\delta_1$ and no pressure command. The engine may therefor be started and the speed controlled by a hand operated accelerator AH.

It should be said, of course, that anything that can be done with electronics can be done mechanically. In fact, controls can be produced by hydraulics,—and hydraulic amplifiers are a possibility even with sound which can be amplified and produced hydraulically as well as electronically. Controls to perform the same function could also be built using pneumatic principles, but the thing to be concerned with is the intelligence of these controls and what they do,—whether they are electronic controls or other means.

The reservoir and charge pump perform another, second, function. They serve to pressurize the low pressure side of the system which at all times must be at a specific pressure whether the car is in regeneration mode or drive mode. A system of two check valves is therefore used. When the car is regenerating it supplies pressure to what was previously the high pressure side and vice versa, when the car goes into the other mode.

Although a hydrostatic system like this, improves the gas mileage of an automobile on the road, for example, or any other similar such energy system, it is mainly because of the fact that engines require tailoring to their load conditions. The hydraulic system in itself loses more energy than a conventional transmission as such. Therefor while this system provides better road gas mileage throughout the control parameters, it could be done better if at certain points a straight-through mechanical system could be incorporated. In any drive system there is probably a range where a straight-through non-variable mechanical system would be optimum. This is the case in the described system in which at 55 feet a second and upwards, a straight-through mechanical drive for a properly chosen ratio does optimize the system without the hydraulic arrangement. Therefor, it is arranged so that above 55 feet per second when $n_{2c}$ equals $n_2$, a mechanical drive is clutched into service and the hydraulics are clutched out. The control for this comes from the $n_2$ command system at C which closes and opens the clutches as required and shown on the diagram. This in the present case improves the gas mileage during that part of the range by approximately an additional 25%.

The following description is both theoretical and practical since it is based on the constructed embodiment of this invention. it being appreciated that some of the material above may be repeated. However, for completeness sake it is included in the present description.

In the present embodiment, continuously variable units are used for both hydraulic pump and motor (FIGS. 1 and 2). A hydro-pneumatic accumulator is so incorporated that automatic combined and independent operation with the engine is provided. The pressurized reservoir feeds the accumulator while maintaining system boost pressure and a clutch operated mechanical bypass is used to eliminate hydraulic system losses in the steady state cruise range.

The advantages of this arrangement are for the most part self-evident, but the importance of the second swash plate at $m_2$ should be emphasized viz:

(a) It provides modulated deceleration control, (b) modulated accumulator output with minimum energy loss, and (c) completes the contro loop permitting system pressure as well as engine torque to be optimized. Electronic control of the engine throttle and both swash plates is based on three read only memories which receive coordinates resulting from three equations (FIGS. 4 and 5). A flow system capable of satisfying this philosophy is shown in FIG. 2 where two continuously variable units are shown at $m_1$ and $m_2$ in a hydrostatic loop, with an accumulator at m1 suction. The reservoir supplies boost to both sides of the loop via $CV_3$ and $CV_4$ as well as providing accumulator flow and makeup is provided by the makeup pump. The throttle potentiometer $A_p$ provides the primary driver-input (FIGS. 4 and 5) and the brake potentiometer provides regenerative control and mechanical brakes. The mode control DPS confirms $\delta_1$ and $\delta_2$=zero, $C_1$ and $C_{1A}$ disengaged (FIG. 3) and $SV_{1,2,3}$ closed when in the park P position. A hand control is provided for engine starting etc. and an override control (for simplicity not shown) is provided, permitting the driver to lock the system into hydraulic mode when driving conditions are such that excessively frequent shifts would occur.

As reverse is accomplished by running the motor swash plate in the reverse quadrant, hydraulic flow and characteristics are identical to forward operation.

Basic Theoretical Considerations as applied to the embodiment

FIG. 6 which is a performance graph of the Toyota 2TC engine, derived from a rig calibration in actual experiments, demonstrates the efficiency versus $n_1$ and torque, in terms of BSFC. It is evident from this graph that engine efficiency can be optimized for any load demand providing the appropriate engine speed is maintained. Viz: efficiency Torque.

Also $T_1$ $\delta_1\Delta P_2$ which suggests controlling $\delta_1$ by $\Delta P_2$ via $n_1$. It will be evident after some thought that control initiation would not take place as $\Delta P_2$ could not be raised, $\delta_1$ being initially zero. Consequently $n_1$ is controlled by a function of $\Delta P_c$ minus $\Delta P_3$ via $\delta_1$ which has the facility to optimize engine torque also when the accumulator is charged, at which time $\Delta P_2 \neq \Delta P$ at the pump. The volumetric efficiency of a hydrostatic system being approximately proportional to pressure, suggests the optimization of the pressure power relationship. The latter may be accomplished by controlling system pressure by $A_p$ via the throttle valve and when the accumulator is charged the engine contribution is proportional to $\Delta P_c$ minus $\Delta P_3$.

A fixed engine/road wheel ratio is superior to hydraulic drive for a considerable portion of the steady state range due to its better efficiency (Table 2A and FIG. 3). It is arranged so that no motoring losses result from the hydraulic components, nor does leakage occur other than that produced by the low boost pressure.

The regeneration of braking energy, whis is considerable in urban driving, is treated in Appendix I (FIG. 8).

Hydraulic Operation

Assuming some charge in the accumulator, the engine running and the drive/park control (DPC) in the drive position: (FIG. 2). When the accelerator is depressed:

(a) $A_p$ commands a pressure $\Delta P_c$ via the butterfly valve
(b) $\Delta P_c$ commands $n_2$ resulting in $\delta_2$ > minimum
(c) $SV_{1,2,3}$ open with $n_2$ command > zero
(d) Vehicle accelerates under accumulator influence when $\Delta P_c \leq \Delta P_3$.
Flow is via C B F and E
In the event that the pressure commanded is greater than $\Delta P_3$:
(e) $\Delta P_c - \Delta P_3$ increases the butterfly setting matching $\Delta P_2$ to $\Delta P_c$
(f) $n_{2c}$ modulates $\delta_2$ determining $n_2$
(g) $n_{1c}$ modulates $\delta_1$ determining $n_1$
(h) $\Delta P_4$ > zero closes $CV_1$ putting accumulator pressure and pump pressure into a summation mode.
When the accelerator is closed:
(i) $SV_{1,2,3}$ close with $n_2$ command being zero
(j) $n_{1c}$ = zero returns $\delta_1$ to zero
(k) $\delta_2$ returns to a blocked minimum of 10% applying light breaking.

When the brake is applied:
Increasing $\delta_2$ via the brake potentiometer causes flow to increase from the reservoir to the accumulator via H, F and D.

As will be clear, FIGS. 1 and 1a, show a hydrostatic system comprising a carburetted engine driving a variable displacement motor/pump, capable of swash plate operation both sides of centre. An accumulator (ACC) is connected to both sides of the main loop and a reservoir (RES) to the low pressure side. The motor swash plate goes to reverse side of centre for both braking and reverse operation. Check valve (CV1) permits freewheeling and facilitates accumulator direct operation. When higher pressures are demanded, CV1 being closed by engine generated pressure difference, accumulator flow becomes serial with the pump flow.

Electronic Control: The same potentiometer wiper is operated by both brake and accelerator pedals. The output ($A_p$) generates two basic commands, engine speed by modulating the throttle valve (6) and system pressure ($\Delta P_2$) by adjusting the motor/swash plate setting ($\delta_2$)$\eta_1$, becomes a function of $\Delta P_{2c} - \Delta P_3$ to compensate for energy available from HP. The final degree of freedom is under the influence of $P_{1c}(\eta_1)$ by manipulation of the pump swash plate ($\delta_1$). Control techniques using various combinations of parameters applied to this and other hydraulic arrangements were investigated but the system illustrated, where manifold pressure and engine speed are used to optimize engine operation, was adopted although some of the variations following the same basic logic are acceptable alternatives.

Mode by Mode Operation

Park: In this mode the drive/park control of the car (not shown) sends $\delta_1$ to zero, $\delta_2$ to maximum, confirms that SV1 (FIGS. 1 and 2) is closed and opens ignition and control-power supply circuits.

Start: This mode differs from "park" in that power circuits are energized and throttle control under the influence of $S_3$ becomes proportional to $A_p$. Throttle feed back is omitted in FIG. 1 for better readability.

Drive: In this mode all controls are in automatic. Assuming the accumulator empty and the engine running; when the accelerator is depressed, AS closes SV2 and opens SV1. A speed command increases throttle angle. The resulting increase in engine RPM ($n_1$) provides a manifold pressure command that is satisfied by the modulation of $\delta_1$ consequently pump displacement. The engine speed/torque relationship is thus determined. Concurrent with the speed command a pressure command is issued [$\Delta P_{2c}(A_p)$] that modulates the motor swash plate ($\delta_2$). $\Delta P_2$ therefore follows a predetermined curve. Flow of hydraulic fluid is via the main loop only. Should $\Delta P_{2c} \leq \Delta P_3$ (accumulator charged) then $\delta_2$ control is provided proportional to $A_p$, a zero $n_1$ command is sent and flow takes place via SV1 and CV1 driving the motor and returning to the Reservoir (RES). When the same conditions prevail except that $\Delta P_{2c} > \Delta P_3$ normal drive conditions prevail except that a pump generated differential pressure across CV1 closes that valve and flow from the Accumulator (ACC) passes to the inlet of the pump.

Brake: In this mode, when the brake pedal is depressed, a zero $n_1$ command is issued and $\delta_2$ control is switched to direct $A_p$ proportional control. System pressure closes CV1 and flow to ACC is from RES via the motor/pump unit and CV2. Should ACC fully charge during the cycle, constant pressure fluid friction braking continues via RV1. In the event of emergency braking being required, additional pressure on the pedal after the potentiometer has reached its "stop" causes the output of a load cell LC to apply mechanical brakes.

Reverse: This mode operates identically to forward mode except that the drive park control reverses the direction of $\delta_2$ control and sends the swash plate to the other side of centre.

Mechanical Bypass

It is an advantage to bypass the hydraulic system with a direct mechanical drive, during some portion of the vehicle's cruise range. In the subject case this is above about 50 ft/sec. with a 1.3:1 engine to road wheel ratio. This is straightforward design work but two points are made below:

(1) An $n_2$ speed command generator (not shown in FIG. 1) provides $n_{2c}(A_p)$.

The mechanical bypass is activated in steady state only when velocity exceeds 55 ft/sec and $n_{2c} = n_2$. The system reverts to hydraulic mode when $n_{2c} > n_2$ by 10%.

(2) The pump and motor are declutched, therefore stationary during operation of the bypass.

The system runs in hydraulic mode until $v \geq 40$ ft/sec beyond which the bypass is available. Above 40 ft/sec when $n_{2c} = n_2$ SV2 closes, $C_{1A}$ disengages after 100 ms, $C_1$ engages after 100 ms, $C_2$ disengages and throttle goes to direct control [T($A_p$)] simultaneously. The system is then running in mechanical bypass mode.

Acceleration is commanded when $n_{2c} + 10\% \geq n_2$ under which circumstances SV2 opens and throttle control reverts to control by $\Delta P_c(A_p)$ simultaneously; after 100 ms $C_{1A}$ engages and $C_1$ disengages simultaneously and $C_2$ engages after 100 ms. The system is thus returned to hydraulic mode until $n_2 = n_{2c}$.

When the brake potentiometer is operated the system is confirmed in hydraulic mode (FIG. 8) and deceleration is controlled by $\delta_2$.

Parameters of the Chosen Automobile

For the purpose of this study the car is assumed to have an area of A = 17 ft$^2$ a drag factor of K = 0.35 and the equivalent dynamic mass is set atm = 77.6 = 2500 lbw. In the interest of simplification and to remain on the conservative side the latter is also used for rolling resistance computation.

Motor size $d_2$ is based on acceleration requirements at maximum system pressure $\Delta P_2 = 5000$ psi. It was elected to design for a velocity of 73.33 ft/s to be reached in less than 12 sec. So we have to add the inertia force to the drag at this velocity to obtain the total thrust force $$F = T_2/r_e + (73.33/12)w/g = 605.9 \text{ lb}$$

and for $\delta_2 = 1$ and $\eta_2 = 0.9$ we have $$d_2 = 24\pi F r_e'/\Delta P_2 \eta_2 = 3.29 \text{ in}^3/\text{rev}$$

The nearest size available is 3.15 in $^3$/rev.

The exact treatment of the acceleration process in the appendix shows that the velocity 73.33 ft/s (50 mph) is really attained in 10.9 sec. (see Table 2).

The hydraulic pump should ideally be operating at optimum during normal cruise (say 80 ft/sec.) at which time $\delta_1$ should approximate 90%, $n_2$ at this speed is 2357 rpm and $n_1$ to give optimum torque is about 1380 rpm; hence $$d_1 = n_2 d_2 \delta_2 / n_1 \delta_1 = 3.12 \text{ in}^3/\text{rev}$$

So we choose $d_1 = d_2 = 3.15$ in $^3$/rev.

Derivation of Design Parameters

The system is required to satisfy three energy equations that may be written:

$$2\pi n T_1/60 = N \text{ for } m_1 \text{ and } m_2$$

and $$\frac{V \Delta P_2}{12 \times 60} = N \text{ for the hydraulic loop } (\Delta P_2 \text{ in psi}).$$

As in a mechanical system the hydraulic system must satisfy continuity conditions viz:

$$n_1 d_1 \eta' \delta_1 = d_2 \delta_2 n_2 / \eta' = V$$

and may be treated with the following three equations:

$$2\pi T_1 = \Delta P_2 d_1 \delta_1 / \eta$$

$$2\pi T_2 = \eta \Delta P_2 d_2 \delta_2$$

$$T_2 = K_1 r_e + K_2 (r_e^3 \pi^2 / 30^2) n_2^2$$

It is evident that while the torque-speed relationship of $m_2$ is predetermined, this is not so for $m_1$ where $n_1$ and $T_1$ are variable at any given load providing their product is not changed. In the case of the loop this holds for V and $\Delta P_2$. This permits optimization of both engine torque and system pressure as $n_1$ and $\Delta P_2$ may be regulated without changing road wheel thrust (FIGS. 2, 6 and 7).

The limiting parameter governing optimization is $n_1$ for on the one hand $m_1$ may not exceed 4000 RPM plus a short duration overrun of some 100 RPM and, in steady state, engine operation at less than about 450 RPM is impractical. It was chosen to optimize over an arbitrary steady state range between 10 and 120 ft/sec with 13" wheels having an effective radius of 10.5" or $r = 0.875$ ft.

It is convenient now to list those parameters which are available direct functions of velocity, namely $D_t$, $N_2$ and $T_2$ (Table 2). Equation 5 may now be derived after $N_1$ viz. $N_1 = N_2 / \eta^2 \eta'^2$ where efficiencies are estimated. Points along the target curve may now be found by applying values of $N_1$ (FIGS. 6 and 7) and projecting for $n_1$. A relevant curve may now be defined viz. $n_1(v)$. A maximum system $\Delta P_2$ has been chosen (Appendix I) and with reference to efficiency maps of hydraulic pumps and motors, a steady state range $\approx 1000$ to 3000 PSI is established. A linear equation is now provided for $\Delta P_2(n_1)$ and $\Delta P_2(v)$ Eq. 6 by substitution. The latter is now modified to converge at $A_P = 140$ and $\Delta P_c = 5000$, (FIG. 4). This being system maximum pressure difference.

Pump and Motor Size

Motor size ($D_2 = \text{in}^3/\text{rev}$) is based on acceleration (lapsed time) requirements at maximum system $\Delta P = 5000$ PSI, the road wheel radius ($r = 0.875$ ft) and the overall ratio ($r_1 = 2.7$), the latter being chosen to suit $n_2$ limits. A design was chosen for a velocity of 73.3 ft/sec to be reached in 12 seconds. For average drag (Da) col. 2 of Table 2A is consulted.

The motor size is therefore:

$$d_2 = \frac{24 D_a \pi r}{\Delta P_2 r_2 \eta} + \frac{24 \times 73.3 \, m \pi r}{12 \, \Delta P_2 r_2 \eta} = 3.1$$

The pump must accommodate the optimum cruise range where $\delta_1$ is greatest. Parameters are selected therefore at $v = 60$ ft/sec, where $T_2 = 26.5$, $n_2 = 1768$, $\Delta P_2$ and $n_1 = 855$. Then if $\eta = 0.9$ $$d_1 = \frac{T_2 n_2 24 \pi}{\Delta P_2 n_1 \eta} = 3.11$$

It is evident in this case that pump and motor should be sized similarly and the nearest size conveniently available was 3.15 in$^3$/rev viz. $m_1$ and $m_2$.

Completion of Table No. 2 and 2A

Table 2 is now completed in accordance with the flow diagram (FIG. 7) using estimated efficiencies, subsequent efficiency values from the appropriate efficiency maps and iteration until desired accuracy is obtained. The constants in the equations are then adjusted for final adjustments of the obtained curve, concentrating on the bottom end as the mechanical bypass is incorporated.

Table 2A is now compiled using ratio $r_1 = 1.3/1$.

Control Curves

An accelerator potentiometer ($A_p$) contains 140 arbitrary units, 100 of which represent steady-state conditions. System pressure ($\Delta P_2$) is commanded by a function of $A_p$ eq. (13). pressure command $\Delta P_c = (A_p)$. As the latter is accomplished by modulating the throttle no engine power is commanded when $\Delta P_3 \geq P_c$ as the throttle will close in order to satisfy $\Delta P_2 = \Delta P_c$.

Car speed is the result of $n_{2c}$ ($\Delta P_c$) eq. (12) which modulates the motor $m_2$ swash plate angle ($\delta_2$). This results in $\delta_2 = 100\%$ when $n_2 < n_{2c}$ so that maximum torque is available on demand for acceleration.

In order to maintain optimum fuel efficiency engine speed $n_1$ must be governed by $m_1$ pressure difference $\Delta P_4$ and to that end there is provided $n_{1c}$ [($\Delta P_c - \Delta P_3$)] eq. (14) (FIGS. 2, 4, and 5) and Tables 1 and 2.

It would appear that 100% $\delta_2$ during acceleration would make control difficult. This however is overcome by exaggerating mechanical throttle travel at the beginning. If $v = 10$ ft/sec is demanded for example, $\delta_2$ will obviously rapidly demodulate at this velocity is quickly satisfied.

If desired, the incorporation of an accelerometer sensitive to horizontal and vertical forces in a system capable of responding to the sum of acceleration and velocity components, so that a given accelerator demand is satisfied by speed and/or acceleration, is feasible.

Some Words on the Attached Appendices (1) Appendix I deals to some considerable depth with the accumulator with the main object of justifying our particular approach. For example, one can contend that the frequency of deceleration from more than about 44 ft/sec to zero is small and therefore negligible in terms of energy saved. It is desired additionally to explain our attitude to the polytropic exponent.

(2) Appendix II deals with available modes of acceleration.

(3) Appendix III describes the hydraulic pump/motor units.

Conclusions

The advantages of this concept, as disclosed in the described embodiment, are manifest in the fact that driver input is at $\delta_2$, both pressure and torque may be optimized and regenerated energy may be independent or in series with the prime mover output.

(1) Any throttling approach to control acceleration during the re-use of regenerated energy, results in very high losses due to non-productive pressure drop over the throttling device, whereas, with $\delta_2$ control, the main pressure drop is the working pressure.

(2) It must be emphasized that optimum system pressure is not necessarily proportional to optimum engine torque for all steady-state conditions.

(3) The series and/or independent, engine/accumulator arrangement permits torque summing, also the vehicle may be driven without running the engine.

It is estimated at this point that, based on a mixed urban-suburban-highway driving environment, mileage will exceed 70 MPG, which value also represents the highway cruise mileage expected. An interesting speculation is that urban driving mileage may, in fact, exceed highway mileage.

The foregoing estimate includes an adequate contingency to allow for car auxiliary power consumption and the simplified treatment of drag etc. in this study.

By reason of the control techniques developed, it is expected that one will achieve excellent drivability and flexibility.

APPENDIX I—Braking and Acceleration

THE PNEUMATIC ACCUMULATOR

1. General

The function of the pneumatic accumulator is to store energy during braking and to spend it subsequently for accelerating the car. This involves a considerable saving of energy and hence of fuel, especially in urban driving.

Here the question arises whether or not the compression of the accumulator gas can be regarded as an adiabatic process. Clearly, the adiabatic process is a limiting case (with no heat exchange at all). The other limit is found by assuming that heat losses from the accumulator vessel to the environment are negligible (this can be ensure, if necessary, by thermal insulation) but that the vessel itself is always at the same temperature as the gas. Then the energy stored per pound of gas will be greater than that stored by adiabatic compression, due to the fact that—according to assumption—the shell acts as a heat sink and stores additional energy which is recovered during expansion of the gas.

The real process is probably much closer to the adiabatic than to the other limit. For convenience, therefore regard the process as adiabatic. This will involve only a minor error and that on the safe side.

In the working pressure range, the accumulator gas (nitrogen) does not follow the ideal gas closely. Exact results can be obtained by using a recently developed empirical equation of state. Formulae have been set up for pressure, internal energy, enthalpy and entropy as functions of density and temperature. By means of these formulae, the energy stored per unit mass of gas is found as the difference of the internal energies at the beginning and the end of the process while the entropy remains constant. Assuming an initial temperature $T_1 = 70°$ F. $= 294.44$ K., an initial pressure $P_{11} = 3000$ psia $= 206.9$ bar and final pressure $P_{12} = 5000$ psia $= 344.83$ bar, one finds the initial density $\rho_1 = 14.01$ [lb/ft$^3$] $= 0.2245$ [kg/lit] the final density $\rho_2 = 17.79$ [lb/ft$^3$] $= 0.285$ [kg/lit] the final temperature $T_2 = 153.8°$ F. (341 K.) the stored energy $\Delta E = 8518.4$ [ft lb/lb] $= 25.47$ [kJ/kg]

2. Accumulator Size

The accumulator is assumed to be a spherical vessel of inside diameter D, provided with a bellows and fitted with compressed nitrogen gas. Its size is to be such that it can store the kinetic energy W of the car at a velocity of 44 [ft/s] $= 30$ mph (disregarding losses). This is often the speed limit in urban driving. On the open road, one seldom slows down from full speed to zero, so that the capacity of the accumulator will seldom be exceeded.

Then for a car weight of 2500 lb one has $W = 75155.5$ [ft/lb] $= 101.94$ kJ and the weight of the gas needed for storage will be $w_g = W/\Delta E = 8.8227$ lb $= 4$ kg and its volume at pressure $P_{11}$ will be $V_1 = 0.6292$ ft$^3 = D^3\pi/6$. The thickness of the shell has to be $d_s = DP_{12}/4\sigma$ where $\sigma$ is the acceptable stress of the material. If $\gamma_s$ is the specific weight of the shell material (Steel), the weight of the shell will be $$w_s = \gamma_s D^2 \pi d_s = 1.5 V_1 \gamma_s P_{12} \sigma = (1.5 P_{12} \gamma_s / \sigma \Delta E \rho_1) W \quad (15)$$

The weight of the hydraulic liquid that enters into the accumulator will be $$W_L = (\gamma_L W / \Delta E)(1/\rho_1 - 1/\rho_2) \quad (16)$$

where the specific weight of the liquid is $$\gamma_L = 53 \text{ [lb/ft}^3\text{]} = 0.85 \text{ [kg/lit]} = 0.85 \text{ [g/cm}^3\text{]}$$

Further $$\gamma_s = 0.28 \text{ [lb/in}^3\text{]} = 483.84 \text{ [lb/ft}^3\text{]} 7.75 \text{ [g/cm}^3\text{]}$$

$$p = 50000 \text{ psi} = 3448.3 \text{ bar}$$

So one finds the total weight of the accumulator $$w_t = w_g + w_L + w_s = 8.82 + 7.08 + 45.7 = 61.6 \text{ lb} = 27.94 \text{ kg}$$

The volume of the hydraulic liquid in the accumulator is $$V_L = 0.13356 \text{ [ft}^3\text{]} = 3.782 \text{ lit}$$

The total volume of the sphere is $V_1 = 0.63$ ft$^3$, corresponding to an inside diameter $$D = 12.76 \text{ in} = 32.41 \text{ cm}$$

If the sphere is replaced by two spheres having the same total volume and weight, their diameters will be 10.13 in $= 25.72$.

3. Regenerative and Friction Braking

Normally, in the first part of the braking process the braking is purely regenerative. The hydraulic motor (driven by the road wheels) acts as a pump and pressure liquid into the accumulator while liquid is sucked from the low-pressure container. So the accumulator pressure increases from an initial value $P_{11}$ up to $P_1$ while the volume of the gas decreases from $V_1$ to $V$. Since there is a constant gear ratio between the hydraulic motor shaft and the road wheels, we have $$V = V_1 - Bs \quad (17)$$

where s is the distance traveled by the car during regenerative braking and the constant B has the dimension of an area. Evidently $$B = \eta' d_2 \delta_2 / 2\pi r_e$$

The motor swashplate is set at maximum displacement so that $\delta_2 = 1$.

The energy differential that is stored in the accumulator will be $$-(P_1 - P_5)dV = B(P_1 - P_5)ds = \eta F ds$$

where $P_5$ is the low pressure level, F is the braking force and $\eta$ is the mechanical efficiency of the hydraulic motor.

The dynamic equation for the vehicle is $$-(w/g)\frac{dv}{dt} = F + k_1 + k_2 v^2 \quad (18)$$

where $k_1$ is the road resistance (including gear friction) and $k_2$ is the drag factor.

Introducing the kinetic energy $W = (w/2g)v^2$ and the constants $$k_3 = 2k_2 g/w$$

$$k_4 = k_1 - BP_5/\eta$$

we can write eq. (18) in the form $$\frac{dW}{ds} + k_3 W + k_4 + (B/\eta)P_1 = 0 \quad (18a)$$

This is a linear differential equation for W which can be solved by quadratures if $P_1$ is expressed as a function of s. This is down by means of eq. (17) and a formulae P and S.

So the solution of eq. (18a) is $$W = e^{-k_3 s}\left[ W_1 - (k_4/k_3)(e^{k_3 s} - 1) - (B/\eta)\int_0^s P_1 e^{k_3 s} ds \right] \quad (19)$$

where $W_1$ is the initial kinetic energy.

The accumulator will be fully charged when the liquid volume $V_L$ has been pumped into it. The corresponding distance is $$S_2 = V_L/B = 152.23 \text{ ft} = 46.4 \text{ [m]}$$

The corresponding energy $W_2$ is found from eq. (19). At this point, the pressure has reached its maximum acceptable value $P_{12}$. From then on, the accumulator is inactive while the pressure is kept constant by liquid friction in RV2.

Using the conditions: for $s = s_2$, $W = W_2$, $v = v_2$, $t = t_2$, one finds for the liquid friction braking period closed formulae for W, v and t (time elapsed from the beginning of braking). Letting $W = 0$ allows the total braking distance $s_3$ to be calculated. The results are shown in Table 3.

The numerical data used were as follows:

| | |
|---|---|
| $d_2 = 3.15$ [in$^3$] | $r_e = 0.324074$ ft |
| $k_1 = 45$ lb | $k_2 = 73.913 \times 10^{-4}$ [lbs$^2$/ft$^2$] |

| | |
|---|---|
| $\eta = 0.9388$ | $\eta' = 0.98$ |

It will be noted that $s_2$ (distance covered during regenerative braking) is independent of the initial velocity $v_1$. Energy $W_2$ and velocity $v_2$ at this point, however, are dependent of $v_1$ and so are $s_3$ and $t_3$.

It has been assumed here that the initial velocity of the car has been large enough for the accumulator to be fully charged by regenerative braking. The minimum initial velocity required for this is found by letting $s = s_2$ and $W = 0$ in eq. (19). One finds $$v_{1\ min} = 46.5 \text{ [ft/s]} = 31.7 \text{ mph} = 51 \text{ [km/h]}$$

If the initial velocity is less than $v_{1\ min}$, the car will come to a standstill before the accumulator is fully charged. Under these circumstances, the braking is purely regenerative and the braking distance is, of course, dependent on $v_1$. One finds it by trial and error from eq. (19). The braking time is found by numerical integration.

For emergency cases, dry friction brakes are available on all four wheels.

Table 3 is a brief summary of braking distances in the normal (regenerative plus liquid friction or purely regenerative) and emergency modes of braking. The road friction coefficient has been assumed to be 0.64.

TABLE 3

| | Braking Distances | |
|---|---|---|
| Mode | Initial Velocity | Braking Distance |
| Normal | 60 mph (96.54 km/h) | 463.49 ft (141.27 m) |
| Normal | 31.7 mph (51 km/h) | 152.23 ft (46.4 m) |
| Emergency | 60 mph (96.54 km/h) | 179.62 ft (54.75 m) |
| Emergency | 31.7 mph (51 km/h) | 50.78 ft (15.48 m) |

APPENDIX II

MODES OF MAXIMUM ACCELERATION

1. Acceleration by Engine Action

The first mode of acceleration is by engine action alone. It is assumed that the accumulator is in the discharged condition. Acceleration of the vehicle from zero to cruising velocity is achieved in two stages. At first, the torque is limited by the maximum pressure acceptable in the hydraulic system. Hence, the thrust force $F'$ is constant and the engine power output increases with velocity, starting from zero. When the power output is equal to the full rated power of the engine, it remains constant while the thrust force decreases. This is the second stage of the acceleration process.

From the dynamic equation it follows:

$$dt = (w/g)dv/(F - k_1 - k_2 v^2) \quad (20)$$

First stage: $P_2 = \text{const} = P_{12}\ \delta_2 = 1$
Then $$F = \text{const} = T_2/r_e = \eta(P_{12} - P_5)d_2/2\pi r_e$$

and from eq. (20) we find $$t = [w/2g\gamma(F - k_1)]\ln[(1 + \gamma v)/(1 - \gamma v)] \quad (21)$$

-continued $$s = \int_o^t v\,dt = -[w/2g\gamma^2(F - k_1)]\ln(1 - \gamma^2 v^2) \quad (22)$$

where $$\gamma = \sqrt{k_2/(F - k_1)} \quad (23)$$

The power output of the engine is $$N_1 = 74HP = 40{,}700 \text{ [ft lb/s]} = n_2 d_2 \delta_2 \Delta P_2/60(\eta\eta')^2 \quad (24)$$

Then, since $\Delta P_2 = P_{12} - P_5$ is known, $n_2$ can be calculated for this transition point from eq. (24). One finds $n_2 = 1537.66$ rpm. The corresponding velocity is then $v_2' = 52.18$ [ft/s] $= 35.58$ mph $= 57.24$ [km/h]. The corresponding time and distance are found from eqs. (23) and (24):

$$t_2' = 7.825 \text{ sec } s_2' = 205.5 \text{ ft} = 62.64[m]$$

Beyond this point, the power output remains constant and therefore, according to eq. (24), the system pressure $P_2$ must decrease with increasing $n_2$. This is the second stage of the acceleration process. We have therefore, $$N_2 = (\eta\eta')^2 N_1 = 32{,}560 \text{ [ft lb/s]}$$

$$F = N_2/v$$

Substituting this in (20) and satisfying the conditions:

for $v = v_2'$ $t = t_2'$ $s = s_2'$ one finds for the second stage closed formulae for t and s as functions of v.

It will be noted that the denominator in (2) becomes zero for $$v = v_{oo} = 151.57 \text{ [ft/s]} = 103.34 \text{ mph} = 166.28 \text{ [km/h]}$$

This is the end velocity the vehicle considered here can attain if there is no speed limit, i.e., on a race track.

2. Acceleration by Simultaneous Accumulator and Engine Action

If the accumulator is in the charged condition owing to previous regenerative braking, acceleration is accomplished by connecting the accumulator in series with the pump (cf. FIG. 2). This will ensure that the system pressure is always at its maximum acceptable value $P_{12} = 5000$ psia so that the maximum possible acceleration will be obtained. This is the second mode of acceleration.

This goes on until the accumulator is completely discharged. The distance covered up to that point is $s_2'' = V_L(2\pi r_e \eta'/d_2) = 146.2$ ft $= 44.56$ 8 m]. From here on, acceleration is accomplished by engine action alone (Mode 1). Since $s_2'' < s_2'$, the engine power is sufficient to maintain maximum pressure and the pressure will decrease only beyond the transition point, i.e. for $s > s_2'$.

So there is no difference in the acceleration behaviour of the car in Modes 1 and 2. Table 4 applies to both modes equally. However, as long as the accumulator is active (Mode 2), the engine has only to contribute the difference between accumulator pressure and maximum pressure and consequently very little energy and very little fuel are consumed until the accumulator is discharged.

Table 4 shows the length of time required for attaining velocities of 30, 50 and 60 mph both in Modes 1 and 2. The specification is easily met.

TABLE 1

| Form of Equations Used for Table 2 and the Control curves | |
|---|---|
| $D_t = 45 + 0.005739v^2$ | 1 |
| $N_2 = 0.00182vD_t$ | 2 |
| $T_2 = 0.37 D_t$ | 3 |
| $N_1 = N_2/\eta_1\eta_2\eta_1'\eta_2'$ | 4 |
| $n_1 = 480 - 2.75v + 0.15v^2$ | 5 |
| $\Delta P_2 = 1062 - 3v + 0.165v^2$ | 6 |
| $T_1 = N_1 h/2\pi n_1$ | 7 |
| $\delta_1 = T_1 24\pi\eta_1/P_2 d_1$ | 8 |
| $V = n_1 d_1 \delta_1 \eta_1'$ | 9 |
| $n_2 = 29.466v$ | 10 |
| $\delta_2 = V\eta_2'/n_2 d_2$ | 11 |
| $n_{2c} = 35.36 A_p$ for $0 \geqq A_p \geqq 100$ | 12 |
| $\Delta P_c = 1062 - 3.6 A_p + 0.2376 A_p^2$ for $0 \geqq A_p \geqq 140$ | 13 |
| $n_{1c} = 0.8891 (\Delta P_c - \Delta P_3 - 500)$ for $1051 \geqq (\Delta P_c - \Delta P_3) \geqq 5000$ | 14 |

TABLE 2

CAR OPTIMIZATION AND PERFORMANCE PARAMETERS
SEE TABLE 2B FOR SI UNITS

| | EQUATION | | | | | | | | | | | |
|---|---|---|---|---|---|---|---|---|---|---|---|---|
| | 1 | 2 | 3 | 4 | 5 | 6 | 7 | 8 | 9 | 10 | 11 | | MILE- |
| v | $D_t$ | $N_2$ | $T_2$ | $N_1$ | $n_1$ | $\Delta P_2$ | $T_1$ | $\delta_1$ | V | $n_2$ | $\delta_2$ | SFC | AGE |
| 120 | 151.42 | 33.07 | 56.024 | 42.836 | 2310.0 | 3078.0 | 97.393 | 0.712 | 4988.7 | 3535.9 | 0.430 | 0.415 | 35.4 |
| 110 | 134.42 | 26.91 | 49.735 | 34.194 | 1992.5 | 2728.0 | 90.133 | 0.748 | 4525.7 | 3241.3 | 0.430 | 0.41 | 41.2 |
| 100 | 118.90 | 21.64 | 43.993 | 26.882 | 1705.0 | 2412.0 | 82.807 | 0.784 | 4067.2 | 2946.6 | 0.428 | 0.4 | 48.8 |
| 90 | 104.86 | 17.176 | 38.798 | 21.179 | 1447.5 | 2128.5 | 76.845 | 0.827 | 3650.1 | 2651.9 | 0.425 | 0.4 | 55.8 |
| 80 | 92.296 | 13.438 | 34.150 | 16.448 | 1220.0 | 1878.0 | 70.810 | 0.865 | 3219.7 | 2357.3 | 0.421 | 0.4 | 63.8 |
| 70 | 81.211 | 10.346 | 30.048 | 12.602 | 1022.5 | 1660.5 | 64.731 | 0.896 | 3801.5 | 2062.6 | 0.418 | 0.41 | 71.1 |
| 60 | 71,604 | 7.819 | 26.493 | 9.571 | 855.0 | 1476.0 | 58.790 | 0.916 | 3403.4 | 1768.0 | 0.418 | 0.415 | 79.3 |
| 50 | 63.475 | 5.776 | 23.486 | 7.247 | 717.5 | 1324.5 | 53.051 | 0.922 | 2028.2 | 1473.3 | 0.423 | 0.42 | 86.2 |
| 40 | 56.829 | 4.137 | 21.025 | 5.310 | 610.0 | 1206.0 | 45.722 | 0.867 | 1615.3 | 1178.6 | 0.420 | 0.45 | 94.1 |
| 30 | 51.651 | 2.820 | 19.111 | 3.810 | 532.5 | 1120.5 | 37.487 | 0.749 | 1205.7 | 884.0 | 0.416 | 0.46 | 90.0 |
| 20 | 47.956 | 1.746 | 17.744 | 2.605 | 485.0 | 1068.0 | 28.214 | 0.563 | 821.1 | 589.3 | 0.422 | 0.5 | 80.6 |
| 10 | 45.739 | .832 | 16.718 | 1.387 | 467.0 | 1051.1 | 15.587 | 0.295 | 395.8 | 294.7 | 0.397 | 0.9 | 42.0 |
| ft/s | lb | HP | lb. ft | HP | RPM | PSI | lb. ft | | in³/min | RPM | | lb/BHPh | mi/Ga |

TABLE 2A

CAR OPTIMIZATION AND PERFORMANCE PARAMETERS
SEE TABLE 2C FOR SI UNITS

| v | $D_t$ | $N_2$ | $T_{2A}$ | $T_{1A}$ | $N_1$ | $n_{2A}$ | $n_{1A}$ | SFC | MILEAGE |
|---|---|---|---|---|---|---|---|---|---|
| 120.951 | 151.416 | 33.069 | 66.244 | 82.824 | 33.743 | 1309.6 | 2095.3 | 0.4 | 46.68 |
| 110 | 134.419 | 26.911 | 58.808 | 73.527 | 27.460 | 1200.9 | 1920.7 | 0.4 | 52.58 |
| 100 | 118.900 | 21.640 | 52.019 | 65.038 | 22.081 | 1091.3 | 1746.1 | 0.4 | 59.44 |
| 90 | 104.859 | 17.176 | 45.876 | 57.358 | 17.526 | 982.2 | 1571.5 | 0.4 | 67.40 |
| 80 | 92.296 | 13.438 | 40.380 | 50.486 | 13.712 | 873.0 | 1396.9 | 0.4 | 76.57 |
| 70 | 81.211 | 10.346 | 35.530 | 44.422 | 10.557 | 763.9 | 1222.3 | 0.43 | 80.95 |
| 60 | 71.604 | 7.819 | 31.327 | 39.167 | 7.979 | 654.8 | 1047.6 | 0.51 | 77.41 |
| 50 | 63.475 | 5.776 | 27.770 | 34.720 | 5.894 | 545.7 | 873.0 | 0.58 | 76.79 |
| 40 | 56.824 | 4.137 | 24.860 | 31.083 | 4.221 | 436.5 | 698.4 | 0.64 | 77.73 |
| ft/s | lb | HP | lb. ft | lb. ft | HP | RPM | RPM | lb/BHPh | mi/Ga |

TABLE 2B

CAR OPTIMIZATION AND PERFORMANCE PARAMETERS (SI UNITS)

| | | Equation | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | | |
| v | v | $D_t$ | $N_2$ | $T_2$ | $N_1$ | $n_1$ | $\Delta P_2$ | $T_1$ | $\delta_1$ | V | $n_2$ | $\delta_2$ | SFC | MILAGE |
| 120 | 36.576 | 673.82 | 24.670 | 75.989 | 31.956 | 2310.1 | 212.28 | 132.100 | 0.712 | 81.750 | 3535.9 | 0.430 | 0.252 | 12.55 |
| 110 | 33.528 | 598.17 | 20.075 | 67.459 | 25.509 | 1992.5 | 188.14 | 122.253 | 0.748 | 74.163 | 3241.3 | 0.430 | 0.249 | 14.61 |
| 100 | 30.480 | 529.11 | 16.143 | 59.670 | 20.054 | 1705.0 | 166.34 | 112.316 | 0.784 | 66.649 | 2946.6 | 0.428 | 0.243 | 17.31 |
| 90 | 27.432 | 466.63 | 12.813 | 52.624 | 15.800 | 1447.5 | 146.79 | 104.229 | 0.827 | 59.814 | 2651.9 | 0.425 | 0.243 | 19.79 |
| 80 | 24.384 | 410.72 | 10.025 | 46.320 | 12.270 | 1220.0 | 129.52 | 96.044 | 0.865 | 52.761 | 2357.3 | 0.421 | 0.243 | 22.63 |
| 70 | 21.336 | 361.39 | 7.718 | 40.756 | 9.401 | 1022.5 | 114.52 | 87.799 | 0.896 | 62.295 | 2062.6 | 0.418 | 0.249 | 25.22 |
| 60 | 18.288 | 318.64 | 5.833 | 35.934 | 7.140 | 855.0 | 101.79 | 79.740 | 0.916 | 55.772 | 1768.0 | 0.418 | 0.252 | 28.13 |
| 50 | 15.240 | 282.46 | 4.309 | 31.855 | 5.406 | 717.5 | 91.34 | 71.956 | 0.922 | 33.236 | 1473.3 | 0.423 | 0.255 | 30.58 |
| 40 | 12.192 | 252.89 | 3.086 | 28.517 | 3.961 | 610.0 | 83.17 | 62.015 | 0.867 | 26.470 | 1178.6 | 0.420 | 0.274 | 33.38 |
| 30 | 9.144 | 229.85 | 2.104 | 25.921 | 2.842 | 532.5 | 77.28 | 50.846 | 0.749 | 19.758 | 884.0 | 0.416 | 0.280 | 31.92 |
| 20 | 6.096 | 213.40 | 1.303 | 24.067 | 1.943 | 485.0 | 73.66 | 38.268 | 0.563 | 13.455 | 589.3 | 0.422 | 0.304 | 28.59 |
| 10 | 3.048 | 203.54 | 0.621 | 22.676 | 1.035 | 467.0 | 72.49 | 21.142 | 0.295 | 6.486 | 294.7 | 0.397 | 0.547 | 14.90 |
| ft/s | m/s | N | kW | Nm | kW | rpm | bar | Nm | | lit/min | rpm | | kg/kWh | km/lit |

Note: 1 bar = $10^5$ Pa $\approx$ 1 at Fuel density 0.775 kg/lit

TABLE 2C

CAR OPTIMIZATION AND PERFORMANCE PARAMETERS (SI UNITS)

| v | v | $D_t$ | $N_2$ | $T_{2A}$ | $T_{1A}$ | $N_1$ | $n_{2A}$ | $n_{1A}$ | SFC | MILEAGE |
|---|---|---|---|---|---|---|---|---|---|---|
| 120.951 | 36.866 | 673.80 | 24.669 | 89.851 | 112.339 | 25.172 | 1309.6 | 2095.3 | 0.243 | 16.56 |
| 110 | 33.528 | 598.16 | 20.076 | 79.765 | 99.729 | 20.485 | 1200.9 | 1920.7 | 0.243 | 18.65 |
| 100 | 30.480 | 529.11 | 16.143 | 70.556 | 88.215 | 16.472 | 1091.3 | 1746.1 | 0.243 | 21.08 |
| 90 | 27.432 | 466.62 | 12.813 | 62.224 | 77.798 | 13.074 | 982.2 | 1571.5 | 0.243 | 23.91 |
| 80 | 24.384 | 410.72 | 10.025 | 54.770 | 68.477 | 10.229 | 873.0 | 1396.9 | 0.243 | 27.16 |
| 70 | 21.336 | 361.39 | 7.718 | 48.191 | 60.252 | 7.876 | 763.9 | 1222.3 | 0.261 | 28.71 |
| 60 | 18.288 | 318.64 | 5.833 | 42.491 | 53.125 | 5.952 | 654.8 | 1047.6 | 0.310 | 27.46 |
| 50 | 15.240 | 282.46 | 4.309 | 37.666 | 47.093 | 4.397 | 545.7 | 873.0 | 0.353 | 27.24 |
| 40 | 12.192 | 252.87 | 3.086 | 33.719 | 42.160 | 3.149 | 436.5 | 698.4 | 0.389 | 27.57 |
| ft/s | m/s | N | kW | Nm | Nm | kW | rpm | rpm | kg/kWh | km/lit |

TABLE 4

LENGTH OF TIME REQUIRED FOR ACCELERATION

| Acceleration to | 30 mph<br>48.27 km/h | 50 mph<br>80.45 km/h | 60 mph<br>96.54 km/h |
|---|---|---|---|
| Mode 1 or 2 | 6.574 | 10.288 | 13.969 sec |
| Specified | 8 | 25 | sec |

The described embodiment can be looked at from another angle since, as in the automobile, any device driven by an engine (particularly a spark ignition engine) that requires to be accelerated by power input and decelerated by braking, has three major areas on energy wastage. In order of magnitude they are:

1. Mis-matching of engine speed for any given steady state condition. i.e.: there is an optimum engine speed for any power output. Miles per gallon on the road or its equivalent may be reduced to 30% of the optimum by gross mis-matching of engine speed.

2. Particularly where rapid acceleration followed by rapid deceleration occurs frequently, as results in city driving of e.g. an automobile, a large proportion of the energy consumed by the vehicle is in the form of kinetic energy which is lost to the environment by applying friction brakes.

3. Losses are introduced also by the system which transmits power from engine to the ultimate driven device. (Transmission)

To improve energy utilization, a continuously variable speed ratio between engine and load is necessary together with a method of storing and re-using energy. The proper and efficient operation of this requires an appropriate control technique.

The system in the described embodiment will use hydraulic, pneumatic and electronic methods to demonstrate a unique flow and control system that satisfies efficiency aims and provides driver controllability.

The first area of loss mentioned is treated by introducing into a hydrostatic loop FIG. 3 a variable displacement pump and motor. Relative speed of input and output may be continuously varied by changing the displacement of either or both pump and motor. It should be emphasized now that increasing one unit and decreasing the other by the same amount will maintain the same input to output torque ratio but will increase or decrease system hydraulic pressure depending upon whether it is the pump or the motor that is increased. This arrangement therefore permits optimization of engine torque as well as, independently system pressure. This system uses the pump swash plate to determine engine speed $n_1$ and the motor swash plate to determine road velocity or the speed of the motor. Engine throttle controls system pressure.

The second area of loss is treated by introducing a vessel pressurized with gas (the accumulator) ACC and a second pressure vessel called the reservoir RES. Oil is driven from the reservoir to the accumulator by the motor when deceleration takes place. The accumulator is placed such that flow may pass, during re-use of energy via SV1 and CV1 to drive the motor and return oil to the reservoir via SV3; CV5 preventing communication of the high pressure with the low. During regeneration the motor swash plate regulates the flow of oil from the reservoir via CV4, CV5 and CV2, SV1, 2 and 3 being closed as a result of a closed accelerator operating the accelerator switch TS, also the brake switch BS ensures that the pump swash plate is at zero when the brake pedal operates the accelerator potentiometer AP, and SV1 prevents oil intended for the accumulator from passing through the bypass line at CV1. This is considered a unique arrangement that accomplishes the objectives while at the same time permitting re-use of regenerated energy most efficiently yet under driver control as no throttling valve is necessary in the oil path, acceleration rate being controlled by the swash plate angle only. It facilitates also the use of engine power simultaneously with accumulated energy. Note that it is important to use regenerated energy during acceleration in order to provide space for regeneration during the following deceleration cycle.

The third area of loss of energy, the transmission system itself. The losses in a hydraulic or similar electrical or pneumatic system are often greater than a simple mechanical system. Their advantage is that they can facilitate efficiencies at the engine that outweigh losses in the transmission; nevertheless the transmission should be optimized and this concept also affords a very convenient method of so doing. This is inherent in the fact mentioned above, that by adjusting both swash plates simultaneously engine and road wheel torque can be maintained while changing system pressure and flow. Thus hydraulic efficiency may be regulated without imparing engine or road wheel conditions.

This unique flow technique facilitates a unique control technique which in combination provides a unique overall system. Having decided to control:

(a) System pressure as a function of AP via the engine fuel input (throttle, etc.)

(b) Engine speed as a function of system pressure command minus accumulator pressure $(\Delta P_c - \Delta P_3)$ FIG. 3. The reason for subtracting $\Delta P_3$ is to facilitate combined engine and accumulator use when the engine would otherwise move off its optimum torque curve.

(c) Motor or road wheel speed as a function of AP via the motor swash plate angle. This has the tendency to send $\delta_2$ to maximum when command speed is greater than actual speed making maximum road wheel torque available to the driver and returning it to optimum when $n_{2c} = n_2$.

An additional feed back intelligence is necessary to adjust for steady state operation with conditions other than level road, no wind and design car weight, this is accomplished by multiplying $n_{1c}$ (engine speed command) by a function of $\delta_2$. This results in the torque or the engine following the optimum curve even under changing environment.

This system may be with or without a mechanical bypass. This is a direct mechanical drive which is automatically engaged and the hydraulic system switched out by three clutches. There is a steady state range where for a given set of vehicle parameters such a device is of considerable fuel saving advantage. When this is included in the system a signal "B" from the $n_2$ intelligence drives the direct throttle control conditioner BC1 putting direct throttle control at the operators disposal via C and sending other controls to zero. "B" is also taken to BC2, the mechanical bypass signal conditioner that appropriately operates C1, C1A and C2. FIG. 3.

A reverse control RS causes the motor swash plate to move past centre reversing direction of the road wheels while permitting the engine and transmission to operate in the normal direction. A drive park control DPC is incorporated. This de-activates engine and pump control via AP allowing the driver by the hand throttle Th to start and control engine speed without powering the road wheels. An alternative claimed for this is to cause DPC to switch $\Delta P_c$ to "E" thence to a conditioner (similar to BC1) to control the throttle as a direct function of $\Delta P_c$ at C.

The emergency valve EV1 is to prevent violent discharge of stored energy should a system burst occur. It is operated by two flow meters (not shown) one at EV1 and one at the reservoir inlet. Should flow at the first position exceed that of the second by a predetermined amount EV1 closes and must be manually re-opened.

Devices etc., named or suggested as alternatives etc., that are not described in detail are current state-of-the-art technology or can easily be devised by an expert.

Just as the invention of a single device will seek protection of the idea of the relative arrangement of materials which produce a result or some aspect of uniqueness, this invention claims a unique arrangement of components electrical, electronic, hydraulic and mechanical etc.

The control logic may be expressed by three polynomials which may vary in degree etc. quite widely depending on chosen system characteristics, plus an additional feed back function from $\delta_2$ viz:

(1) $n_2 (Ap)$
(2) $\Delta P_c (Ap)$
(3) $n_{1c} (\Delta P_c - \Delta P_2)$
(4) $n_1 \delta_2 \% / x$ FIGS. 4 and 7 illustrate this Also, satisfying continuity, three equations govern the power path viz:

(1) At the pump, energy $= [(n_1 T_1)]$
(2) In the hydraulic circuit energy $= [(V \Delta P_2)]$
(3) At the motor engine energy $= [(n_2 T_2)]$ In the described embodiment an example of our control system is given in which it so happens that we use the throttle to control the system pressure and we use the swash plate of the pump to control the engine speed. However, this procedure could be reversed—in other words, the swash plate could be made to control the pressure and the engine throttle valve used to control the speed. This would work although it would make certain differences to the performance and it could be used as an alternative. The same argument could be applied to the whole system since we are dealing with an equation and, as is well known, one can juggle parameters from one side of an equation to the other providing you obey the rules. Such rearrangement is, of course, envisaged as representing further embodiments of this invention.

Mathematical manipulation could still be carried out and different cars could result in certain modifications. However, the described embodiment describes a system which is actually controlling, in one case $\delta_1$ and, in the other case $\delta_2$; $n_2$ of the road wheel speed is commanded and accomplished by adjusting the rear swash plate. Of course, these parameters can be traded one to the other.

It will furthermore be appreciated that units such as the accumulator might be re-arranged but in the location shown in FIG. 2 it seems to make the whole described system controllable and it allows one to go via the engine, summing engine torque and accumulator pressure, or by-passing through a by-pass line which is one operation that indicates the position of the accumulator. The back wheels are driven directly. At the same time one obtains complete control in both modes, because of the rear swash plate control.

It will be understood that the control function of the motor 4 in FIG. 1 may essentially be changed from a velocity function to a pressure function. Thus in FIG. 1 electronic unit 18 willl perform in accordance with a different equation 12 wherein $P_{2c}$ is substituted for $n_{2c}$ in formula 12 and in the graphical representation within unit 18 of FIG. 1, with a corresponding change at the respective connection to reversing switch unit RS. Symbol $P_2$ is substituted for $n_2$ within the respective transducer and on the feed-back connection to RS. Whilst the motor swash plate in FIG. 1 is arranged to control motor speed, it now controls the system pressure.

If we assume for the moment that the motor swash plate is fixed, the engine specific fuel consumption (SFC) can be optimized by adjustment of the throttle and the pump swash plate and system pressure will be a direct function of road load. If we now adjust the motor swash plate system pressure and flow may be altered and the first swash plate adjusted to maintain engine revs, resulting in a change of hydraulic parameters without disturbing engine torque and speed.

It will be observed that check valves CV1 and CV3 permit the engine and accumulator to operate independently or in series without complex control facilities. Viz., consider the voltage $A_p$ (from the accelerator potentiometer) to represent a pressure command. If accumulator pressure is subtracted from this the engine throttle will only be operated when the command exceeds accumulator pressure. At lesser pressure commands the accumulator only will drive. With pressure in excess of this however the throttle is modulated causing the pump swash plate to operate, controlling engine RPM and the resulting pressure closes CV1 putting the accumulator into series with the pump. The advantage of this is that we are able to run down the accumulator completely ready to accept its full potential while making the full design pressure available at all times including when the accumulator pressure is low.

We have thus controlled the three degrees of freedom by three equations. A linear equation may be chosen for either the throttle or the motor swashplate as long as the other two are shaped for optimum in accordance with the engine and hydraulic system performance graphs.

Variations of the described embodiments will readily occur to an expert skilled in the art, especially for gasoline engines or diesel engines. As will be clear above, instead of commanding road speed one can command the pressure ($\Delta P_{2c}$) by modulating the rear swash plate $\delta_2$. It will be understood that the present invention is not restricted to the embodiments disclosed but the scope therefore is determined by the appended claims.

I claim:

1. A system for transmitting the output of an engine to a load in response to a driver's pressure on an accelerator pedal or on a brake pedal including
   (a) a first swash plate device mechanically coupled to said engine and operable in accordance with a first algebraic expression,
   (b) a second swash plate device having a controllable swash plate and operable in accordance with a second algebraic expression,
   (c) the first and second swash plate devices being each capable of independent control and each capable of operating as either a hydraulic pump or a hydraulic motor, a hydraulic system having a first and second line interconnecting said first and second swash plate devices to thereby control the engine speed in accordance with a function of at least one of said algebraic expressions,
   (d) a parallel by-pass hydraulic line across said first swash plate device between said first and second hydraulic lines,
   (e) a check valve connected in said parallel by-pass hydraulic line,
   (f) another check valve connected in said second hydraulic line,
   (g) a high pressure accumulator unit,
   (h) a first solenoid valve arranged when open to connect the output of said accumulator unit to the junction of said first swash plate device and said by-pass hydraulic line in said second hydraulic line, said junction being on one side of said other check valve remote from said second swash plate device, whereby in operation, said accumulator unit discharges to the input side of said first swash plate device,
   (i) a second solenoid valve connected between said accumulator unit and said second hydraulic line,
   (j) control circuits for activating said first solenoid valve and said second solenoid valve,
   (k) a reservoir unit connected to said second hydraulic line on the other side of said other check valve,
   (l) where the first algebraic expression is $\Delta P_c - \Delta P_3$ and the second algebraic expression is $A_p$ where $\Delta P_c$ = Pressure command function,
   $\Delta P_3$ = Accumulator pressure difference ($P_4 - P_3$),
   $A_p$ = Throttle potentiometer setting,
   $P_3$ = Motor outlet pressure
   $P_4$ = Inlet pressure,
   (m) wherein in operation with said accumulator charged up, said driver's pressure activates said control circuits to cause said first and second solenoid valves to open and permit accumulator pressure to be applied through them to said first-mentioned check valve to cause it to open to apply said accumulator pressure through it to the first hydraulic line and to the second swash plate device, said other check valve being automatically closed by said accumulator pressure to prevent fluid-flow therethrough, the accumulator fluid flow being in parallel with the fluid flow from the first swash plate device, (n) wherein, in operation with said accumulator pressure depleted and said driver's pressure requiring a greater pressure than said accumulator pressure can provide, said first-mentioned check valve is automatically closed by the pressure from said first swash plate device to said first hydraulic line to prevent fluid flow therethrough, whereby said accumulator fluid flow is automatically placed in series with the fluid flow from said first swash plate device, (o) wherein, in operation in a braking action of said load, the driver's pressure on said brake pedal activates said control circuits to close said first solenoid valve and open said second solenoid valve to permit fluid pressure from said second swash plate device to automatically charge up said accumulator and store surplus pressure representing kinetic energy of deceleration in said accumulator unit.

2. A system according to claim 1 wherein said reservoir unit is connected to said second hydraulic line through a further solenoid valve.

3. A system according to claim 1 wherein said reservoir unit is connected directly to said second hydraulic line.

* * * * *